United States Patent

Seiter, Jr.

[11] 3,953,740
[45] Apr. 27, 1976

[54] REMOTE POWER SUPPLY UNITS FOR VEHICLES

[75] Inventor: Charles J. Seiter, Jr., Dallas, Tex.

[73] Assignee: Cliff Granberry Corporation, Dallas, Tex.

[22] Filed: Sept. 30, 1971

[21] Appl. No.: 185,239

[52] U.S. Cl. .......................................... 307/10 R
[51] Int. Cl.² ........................................ H02J 1/00
[58] Field of Search ................................ 307/10

[56] References Cited
UNITED STATES PATENTS

| | | | |
|---|---|---|---|
| 3,293,443 | 12/1966 | Burch, Jr. | 307/10 R |
| 3,456,119 | 7/1969 | Schneider | 307/10 R |
| 3,457,491 | 7/1969 | Black et al. | 307/10 R X |
| 3,471,706 | 10/1969 | Schneider | 307/10 R |
| 3,497,709 | 2/1970 | Chilton et al. | 307/10 R |
| 3,571,560 | 3/1971 | Nilssen et al. | 307/10 R |
| 3,586,868 | 6/1971 | Martens et al. | 307/10 R |
| 3,655,991 | 4/1972 | Schneider | 307/10 R |

Primary Examiner—William M. Shoop

[57] ABSTRACT

A vehicular remote electric power supply accessory unit for connection to the electrical system of a motor vehicle to supply electrical power for the operation of electrical hand tools or other electrical power requiring units. The electrical power generating alternator of the electrical system of the vehicle is utilized as a source of power, and switching means is provided for connecting the power output of the alternator selectively to a remote power outlet receptacle and to the customary battery and electrical system circuity of the vehicle. The power output from the alternator is disconnected from the battery circuit while the remote unit is in operation. Means is provided for preventing overloading the voltage regulator of the electrical system of the vehicle from the remote circuit connection and for indicating that the remote circuit is in operation. Means is also provided for accommodating heavy current loads through the switching means.

6 Claims, 8 Drawing Figures

INVENTOR.
Charles J. Seiter, Jr.
BY
ATTORNEY

3,953,740

REMOTE POWER SUPPLY UNITS FOR VEHICLES

SUBJECT MATTER AND OBJECTS OF THE INVENTION

This invention generally relates to a remote power accessory unit for connection in the power generating circuit of a vehicle to provide a remote power outlet for operation of electrically driven power hand tools or other units by means of the alternator of the vehicle.

It is a particular object of the invention to provide an accessory for connection in the electrical circuit of a vehicle for providing a source of high voltage direct current power output for remote operation of electrical power utilizing devices such as 110-120 volt AC-DC power tools or the like.

It is a particular object of the invention to provide, in an apparatus of the character set forth, means for protecting the voltage regulator and alternator power generator of the vehicle against overloads or other harm to the elements of the circuit of the vehicle.

In one form of the invention the output from the alternator or source of power in the electrical system of the vehicle is connected to a double throw switch which alternately connects such power output to the standard vehicle electrical system for charging the battery and operating the vehicle, and in the opposite position connects the power output from the alternator electrical power generator directly to the remote power output unit for providing electrical power at a higher voltage without damage to the electrical system of the vehicle.

Still another object of the invention is to provide, in a circuit of the character described, means for protecting the alternator or electrical generator of the vehicle against overload and for preventing damage to the voltage regulator of the electrical system of the vehicle.

Still another object of the invention is to provide such an accessory power unit which is connectable to most presently known types of vehicle electrical systems for operation therewith to provide a source of power for operating hand tools and the like.

Additional objects and advantages of the invention will be readily apparent from the reading of the following description of a device constructed in accordance with the invention and reference to the accompanying drawings thereof, wherein.

Figure 6:
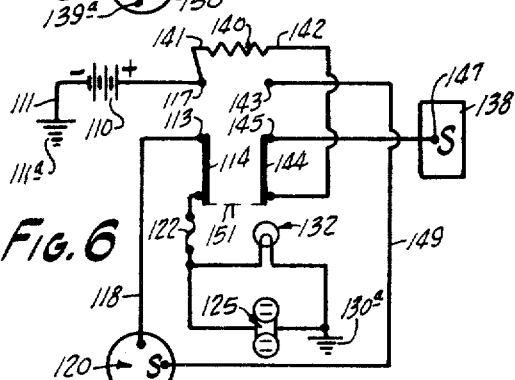
FIG. 6 is a view similar to FIG. 5, showing the switch of the circuit moved to a position connecting the power outlet of the alternator to the power outlet of the remote power unit.
Figure 7:
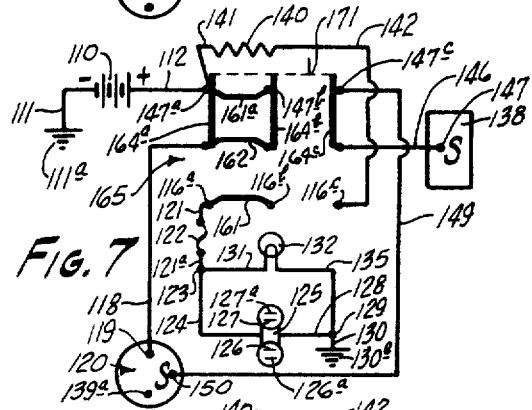
Figure 8:
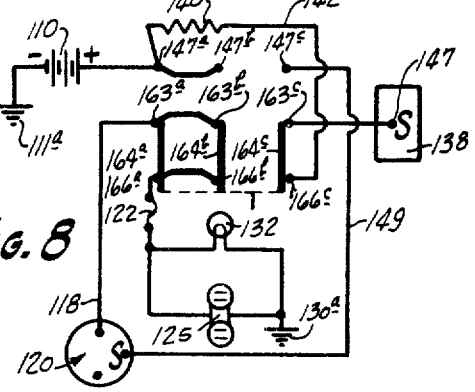

FIG. 7 is a view similar to FIG. 6, showing a modified form of switching device used in the remote power unit circuit connecting the alternator to the usual vehicle electrical circuit of FIG. 6; and, FIG. 8 is a view similar to FIG. 7 showing the switch moved to disconnect the alternator power output from the electrical system of the vehicle and connect it to only the remote outlet of the power unit.

Figure 1:
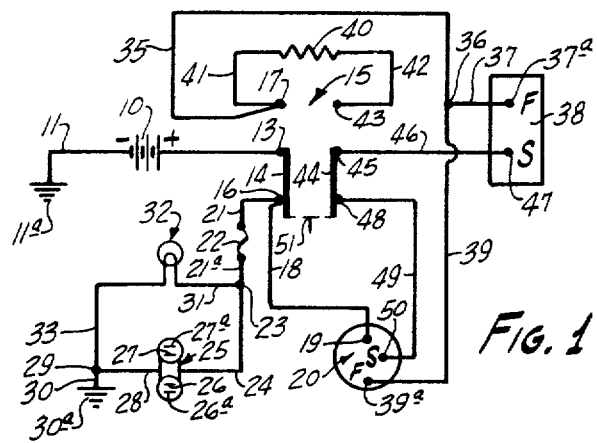
FIG. 1 is a simplified block wiring diagram of a part of the electrical circuit of a vehicle having the remote power unit accessory connected therein and showing the same in position for operating the circuit in the normal manner.
Figure 2:
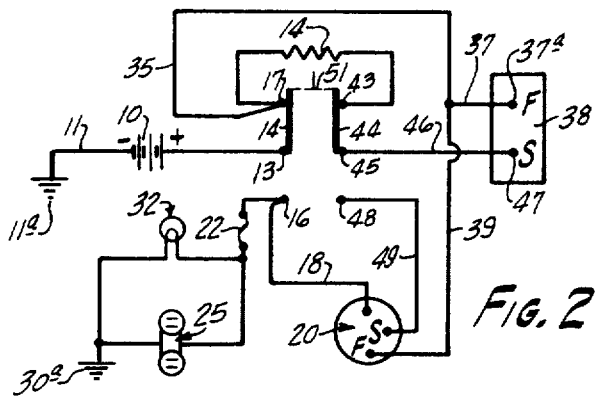
FIG. 2 is a view similar to FIG. 1, showing the system of FIG. 1 with the switch moved to disconnect the power output terminal of the source of power or alternator from the electrical system of the vehicle and connect the same to only the remote power outlet.

In the drawings, FIGS. 1 and 2, is shown schematically a fragmentary wiring diagram of an automobile or motor vehicle power supply system having a remote power unit connected in said system. The usual automobile battery 10 having a conductor 11 leading to a ground connection 11a and a power outlet connection 12 is connected to the swingable blade base or pole connection 13 of a double pole double throw switch 15 having the swingable blade 14 connected thereto and movable between a pair of spaced contacts 16 and 17 for establishing connection between the battery and such contacts. The contact 16 is connected by means of a conductor 18 to a power output post or connection 19 of an alternator 20. A lead or conductor 21 is also connected to the contact 16 and leads to a circuit breaker 22, which may be a fuse or any other suitable means for breaking the circuit in the conductor 21 upon the occurrence of an overload or an undesirable condition in the conductor. A conductor 21a leads from the circuit breaker 22 to a common connection 23 and a conductor 24 leads from the common connection to a duplex power outlet receptacle or socket member 25 of the usual two prong two socket type having contacts 26 and 26a and 27 and 27a, respectively. From the outlet member 25 a conductor 28 leads to a common connection 29 from which a conductor 30 leads to the ground connection 30a. A conductor 31 leads from the common connection 23 to an indicator or signal light 32, which may be of any desired type, as for example a neon signal light which is ignited or becomes illuminated upon the occurrence of a predetermined voltage in the circuit in which it is connected. A conductor 33 leads from the indicator light to the common connection 29 and to the ground to complete the circuit. It will thus be seen that the indicator light is connected in parallel with the power outlet receptacle 25 and will indicate that said circuit is energized; and, if the indicator light is one which becomes illuminated when a predetermined voltage is applied thereacross, will indicate that the desired voltage has been reached.

The contact 17 is connected by a conductor 35 to a common connection 36 which is connected by means of the lead wire 37 to the field contact connection 37a of the voltage regulator 38. From the common connection 36 a conductor 39 leads to the field connection 39a of the alternator 20. A conductor 41 leads from the contact 17 of the switch 15 to a resistor 40 from which a conductor 42 leads to a contact 43 on the same throw of the opposite blade 44 of the double pole double throw switch as the contact 17. The central pole 45 of the other blade 44 of the double pole switch 15 is connected by conductor 46 to the stator contact connection 47 of the voltage regulator 38. The contact 48 for the blade 44 of the double pole double throw switch which is on the same throw as the contact 16 is connected by a conductor 49 which leads from such contact to the stator connection 50 of the voltage regulator. The two blades 14 and 44 of the double pole double throw switch are connected by a common operating handle 51 so that both blades are swung simultaneously from the position in which the blades engage the contacts 16 and 48 to a position in which the blades engage the contacts 17 and 43.

When the switch is in the position shown in FIG. 1, the blades 14 and 44 are in engagement with the contacts 16 and 48 and the alternator is operatively connected to the battery 10 for charging the battery and for operating the ignition system of the vehicle in the usual manner. The voltage regulator functions to control the charge supplied by the alternator to the battery as the vehicle is operated in the usual manner.

In this position of the switch of the remote power unit, shown in FIG. 1, the duplex outlet receptacle 25 is also energized by the same power as is supplied to the battery 10, and may be used to supply power to another battery of another vehicle if desired, or any other low voltage power unit.

When the switch 15 is moved to the position shown in FIG. 2, the blades 14 and 44 are moved into engagement with the contacts 17 and 43. In this position, the alternator 20 is connected by means of the conductor 18, the conductor 21, the fuse or circuit breaker 22, and the conductors 21a and 24 to the duplex power outlet socket 25. Electrical hand tools such as saws, drills, sanders, or the like, or lights, or electric arc welding equipment may be connected to the socket of the power outlet 25 in the usual manner for operation by the power supplied from the alternator to the receptacle.

With the switch in the position shown in FIG. 2, the battery 10 is connected by means of the blade 14 with the contact 17 and the conductor 35, which leads from that contact to the field relay connection of the voltage regulator and to the field connection of the alternator. Thus, the field circuit of the alternator is energized at battery potential. Similarly, the blade 44 connects the stator connection 47 of the voltage regulator 38 with the contact 43 and the conductor 42 from the resistor 40, so that battery power at less than battery potential is applied from the contact 17 through the conductor 41 to the resistor 40 and the conductor 42, and through the blade 44 and the conductor 46 to the stator or field relay connection of the regulator, so that the stator or field relay circuit of the regulator and the ignition circuit is energized by the battery, but the regulator is not connected directly to the stator circuit of the alternator. This reduces or eliminates damage to the coils or wiring of the regulator when the higher voltage remote unit is operated.

Thus, with the switch in the position shown in FIG. 2, the vehicle will run in the usual manner, since the field relay connection of the voltage regulator is connected to the battery and to the alternator through the ignition circuit (not shown) of the vehicle's wiring system. Also, the coils or wiring of the regulator will not be damaged, since the resistor prevents full battery potential being applied to such portions of the regulator. Also, the application of battery potential through the connection 39 to the field connection 39a of the alternator prevents damage to the alternator and assures full and proper operation thereof.

It will thus be seen that a remote power unit has been provided which is connectable into the ignition system of the usual automobile, and when the switch 15 is in the position shown in FIG. 1 the vehicle is operated in the customary manner without interference from the circuity of the remote power unit. Of course, the outlet receptacle 25 is energized from the alternator with a low potential for operation at battery voltage when the voltage regulator acts to cause the alternator to supply power through the circuit to the battery in the usual manner. Also, it will be seen that when the switch is in the position shown in FIG. 2, the battery is disconnected from the alternator and the power outlet receptacle 25 only is connected to the power supply or outlet connection 19 of the alternator and the alternator may be used to provide a voltage of the order of from 90 to 120 volts D.C. to the receptacle for use in operating power hand tools and the like.

It will be understood, of course, that the power hand tools must be of the AC-DC type, since induction type devices cannot be operated by this unit.

Figure 3:
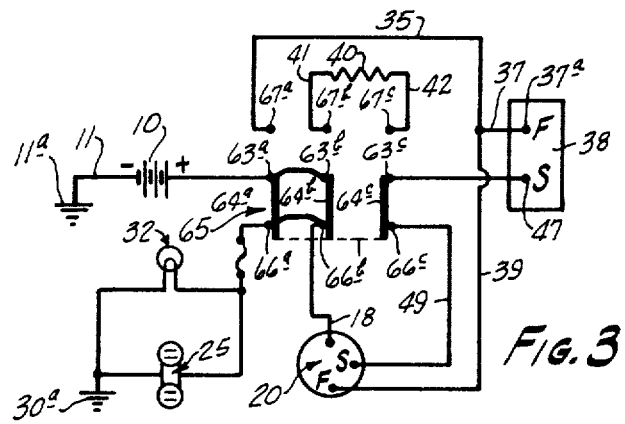
FIG. 3 is a view similar to FIG. 1, of a modified form of electrical circuit and switch constructed in accordance with the invention, and showing the same in normal operating position.
Figure 4:
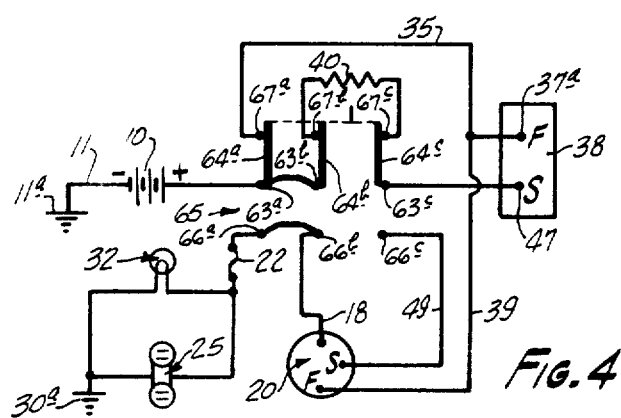
FIG. 4 is a view similar to FIG. 3, showing the switch of the circuit of FIG. 3 moved to a position disconnecting the alternator power output terminal from the vehicle electrical system and connecting it solely to the remote power outlet.

A modified form of the circuit of FIG. 1 is shown in FIGS. 3 and 4, wherein a three pole double throw switch 65 is used rather than the double pole double throw switch 15 of the form of FIGS. 1 and 2. The switch 65 has two adjacent swingable blades 64a and 64b connected by a shunt or strap 62. The blade 64a is mounted on a base or pole 63a, the blade 64 is mounted on a pole or base 63b, and the third blade 64c is mounted on a base or pole 63c. The contacts 66a and 67a on the opposite throws of the blade 64a are engaged by the blade 64a when it is moved from engagement with one to engagement with the other. Similarly, the contacts 66b and 67b are engaged by the blade 64b when it is swung from one throw to the other, and contacts 66c and 67c are engaged by the blade 64c when it is moved between the two throw positions. The contacts 66a and 66b are connected by a shunt or strap 61. A handle 71 connects the three blades 64a, 64b and 64 c for simultaneous movement between engagement with the contacts 66a, 66b and 66c, respectively, and the opposite throw position wherein the blades engage the contacts 67a, 67b and 67c, respectively.

The three pole double throw switch 65 is connected in the circuit in substantially the same manner as that of the form illustrated in FIGS. 1 and 2. The conductor 18 from the voltage regulator 20 is connected to the contact 66b of the switch and thus through the shunt 61 to the contact 66a, and the contact 66a is connected to conductor 21 leading through the circuit breaker 22 and the conductor 21a to the common connection 23 to which the conductor 24 leading to the duplex socket or outlet 25 is connected. The conductor 31 leads from the common connection 23 to the signal lamp 32 and the conductor 32 is connected to the common connection 29 which is also connected to the conductor 28 leading from the duplex outlet socket, and the conductor 30 connected to the common connection 29 leads to the ground connection 30a.

The stator contact 50 of the alternator 20 is connected by the conductor 49 to the contact 66c of the three pole switch and through the blade 64c to the conductor 46 which leads to the field relay connection 47 of the voltage regulator 38. The conductor 39 leads from the field connection or contact 39a of the alternator to the common connection 36 and through the conductor 37 to the field connection 37a of the voltage regulator. Similarly, the conductor 35 connected to the common connection 36 leads from that connection to the contact 67a of the three pole switch and is adapted to be engaged by the blade 65a to connect the battery to such conductor 35 and the field circuit of the regulator and the vehicle electrical system. The contact 67b is connected to the conductor 41 which leads to the resistor 40, and the conductor 42 from the resistor is connected to the contact 67c. The battery is connected by the conductor 12 to the pole 63a of the swingable switch blade 64a, and the ground conductor 11 from the battery is connected to the ground connection 11a of the vehicle.

Thus, it will be seen that when the switch 65 is in the position shown in FIG. 3, the alternator power outlet 19 is connected to the battery 10 by means of the contact 66b and strap 61 and contact 66a which are engaged by the switch blades 64b and 64a, respectively, connected to the base or poles 63b and 63a, respectively, of the switch 65, which are interconnected by the shunt or strap 62, so that the power from the alternator is connected directly to the battery 10 through the conductor 12 in the usual manner. Similarly, the duplex power outlet socket 25 is energized by the same low voltage potential from the generator as the battery.

The blade 64c and the contacts 66c and 67c of the circuit function in the same manner as the blade 44 and the contacts 48 and 43 of the circuit of FIG. 1. When the switch is in the position shown in FIG. 3, the switch blade 64c connects the stator contact 50 of the alternator with the stator or field relay connection 47 of the regulator. When, however, the switch is in the position shown in FIG. 4, the swingable switch blade 64b on the base or pole 63b is connected to the contact 67b and the conductor 41 leads from such contact to the resistor 40 and the conductor 42 so that the resistor is placed in the circuit from the battery to the stator connection 47 of the regulator 38 in the same manner as in FIG. 1 and FIG. 2, while the field circuit of the voltage regulator is energized at battery potential by the connection of the switch blade 64a between the pole 63a and the contact 67a and the conductor 35 in the same manner as the blade 14 connected the pole or base 13 to the contacts 17 and the conductor 35 to apply battery potential to the field circuit of the voltage regulator and to the field circuit of the alternator in FIG. 2. All parts of the circuit other than the switch 65 and its connections are given the same numbers in FIGS. 3 and 4 as they bore in FIGS. 1 and 2.

It will be seen that the two blades 64a and 64b, and four contacts 63a and 63b, and 66a and 66b, of the switch serve to provide a larger current capacity in the switch for delivery of power from the alternator to the battery and ignition circuit when in the battery position, so that the draw or drain from the battery through the automobile ignition and operating circuit including the lights and all the accessory equipment will have a larger current carrying capacity than with the single blade of the double pole double throw switch of FIGS. 1 and 2. The capacity of the switch in the battery connected condition will be double that of the single blade of the double pole double throw switch.

All other advantages of the form first described are present in this form, plus the additional capacity of the switch blades afforded by the extra pole of the three pole double throw switch.

When the remote power unit is used with vehicles having an electrical system in which there is no external conductor from the stator post of the alternator to the voltage regulator, the conductors 46 and 49 from the switch 65 of the remote power unit are disconnected, their exposed portions taped or otherwise insulated and the conductors folded and tied together in an inactive position. In such a case, the electrical circuit from the battery through the regulator to the alternator for energizing the field is carried through the conductors 35 and 39 and the conductor 37 to the regulator. The stator or field relay current between the voltage regulator and the alternator is carried through the usual automobile ignition, light and accessory wiring system in the usual manner. Thus, the remote power unit may be used with most commonly used vehicles for generating a source of power for operating power tools, lights, welders and the like.

Figure 5:
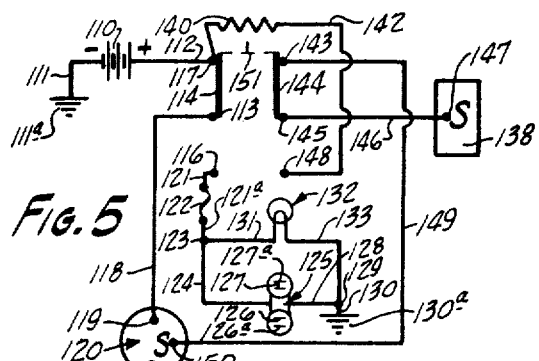
FIG. 5 is a view similar to FIG. 1, of a further modified form of a remote power unit, showing a modified circuit for connecting the electrical power output of the vehicle alternator with the usual vehicle operating electrical circuit.

A further modified form of the invention is shown in FIGS. 5 and 6, wherein the alternator output contact 19 is connected by means of a conductor 118 to the central pole or base 113 for the swingable blade 114 of a double pole double throw switch 115. The contact 116 is connected through the conductor 121 to the circuit breaker or fuse 122 and the conductor 121a which leads to the common connection 123 from which a conductor 124 leads to the duplex outlet socket 125. The conductor 128 leads to another common connection 129 and a ground conductor 130 leads to the ground contact 130a. An indicator light circuit is formed by the conductor 131 leading from the common connection 123 to the lamp or indicator light 132 and a conductor 133 which connects the lamp or signal to the common union 129, whereby the lamp is in a parallel circuit with the duplex outlet and will indicate energization of that duplex receptacle socket or outlet.

The opposite throw contact 117 for the swingable blade 114 of the switch is connected by means of a conductor 112 to the battery 110 which is also connected by the conductor 111 to the ground 111a in the usual manner. From the contact 117 a conductor 141 leads to a resistor 140 which is in turn connected by the conductor 142 to the opposite throw contact 148 of the other swingable switch blade 144 of the double pole double throw switch, and the central post or support 145 of the swingable blade 144 is connected with the voltage regulator 138 by means of the conductor 146. In this form of the device there is no field connection, the circuit being completed to the field connection 139a of the alternator 20 by means of the usual switch controlled ignition, lighting and accessory circuit of the vehicle. The contact 143 for the swingable blade 144 of the switch is connected by a conductor 149 with the stator connection 150 of the alternator 120. In this circuit, with the blades 114 and 144 of the double pole double throw switch 155 in the position illustrated in FIG. 5, the power output post 119 of the alternator 120 is connected by means of a conductor 118 with the base 113 for the swingable switch blade 114, the contact 117, and the conductor 112 with the battery 110. Also, the stator or field relay connection 147 of the regulator is connected by the conductor 146 to the base or support 145 for the swingable switch blade 144 and the contact 143 to the conductor 149 which leads to the stator connection 150 of the voltage regulator. With the switch 115 in the position indicated in FIG. 5, the alternator is connected in the customary operating manner for operation of the vehicle of which it forms a part of the electrical system. The battery will be charged and the vehicle can be run from the power furnished by the alternator through the battery.

When it is desired to use the remote power unit, the double pole double throw switch 115 is moved to the position shown in FIG. 6, wherein the power output post 119 of the alternator is connected by means of the conductor 118, the base support 113 and the swingable switch blade 114 to the contact 116 which delivers the output of the alternator through the conductor 121, the circuit breaker 122, the conductors 121 and 124 to the remote power unit duplex receptacle power outlet socket 125, whereby tools connected with the socket or outlet by means of the contacts 126 and 126a and 127 and 127a may be operated by the power supplied from the alternator. Also, the opposite swingable blade 144 of the switch is moved to the position in which the output from the battery through the conductor 112, the conductor 141, the resistor 140, the conductor 142 is delivered to the contact 148, and then passes through the movable blade 144 in engagement therewith to the base support 145 and through the conductor 146 to the stator or field relay connection 147 of the voltage regulator 138. Thus, the battery 110 is in position to energize the stator or field relay circuit of the voltage regulator a reduced potential to prevent damage thereto during the operation of the alternator and for furnishing power to the vehicle electrical system. The field circuit of the electrical system from the voltage regulator to the alternator is carried through the usual switch controlled ignition, lights and accessory circuitry of the vehicle which is connected to the alternator contact 139a.

In this form of the device, the power output from the alternator through the outlet post 119 and the conductor 118 is delivered to the base 113 for the swingable switch blade 114 of the double throw switch, and the alternator is positively disconnected from the battery circuit when the remote power outlet is in use. Similarly, when the switch is moved to the position shown in FIG. 5, the alternator power output is positively disconnected from any electrical connection with the remote power unit duplex receptacle or socket 125. Thus, the remote power outlet is completely disconnected from the alternator and the vehicle ignition and electrical circuit when the switch is in the position shown in FIG. 5. Also, when the switch is moved to the position shown in FIG. 6, only the remote power outlet of the receptacle 125 is energized by the alternator, and the battery delivers a reduced potential through the resistor 140 to the voltage regulator for energizing the field relay section of the voltage regulator and the field coils of the alternator in the usual manner. Thus, the voltage regulator will not be overloaded and damaged during use.

When used with a vehicle having no external stator circuit connection between the voltage regulator and the alternator, such as some Chrysler products, the conductors 146 and 149 are disconnected from any electrical connection to the voltage regulator and alternator and the vehicle electrical system operates in exactly the same manner as is customary in the usual system.

A further modification of the remote power unit circuit is illustrated in FIGS. 7 and 8, wherein a three pole double throw switch 165 has been connected in the circuit for controlling the supply of power from the alternator 120 to the battery 110 and the vehicle electrical system when the switch is in the position shown in FIG. 7, and for energizing the remote power outlet 125 when the switch is in the position shown in FIG. 8.

This circuit is identical with that shown in FIGS. 5 and 6, except that the extra swingable blade 164b and the extra set of contacts 166a and 166b and the opposite set of contacts 167a and 167b of the three pole double throw switch are connected in the circuit by jumpers or connector straps 161 and 161a, and 162, in substantially the same manner as the two swingable blades of the switch 65 and contacts 66a and 66b of FIGS. 3 and 4 are connected. Identical numerals are given to all other elements of this system as those shown in FIGS. 5 and 6.

The switch 165 is a three pole double throw switch having three side-by-side swingable blades or arms 164a, 164b and 164c, pivotally mounted on posts or bases 163a, 163b and 163c, respectively, for swinging movement on said bases by means of a common handle 171 joining all three blades for concurrent simultaneous identical movement between the two throw positions of the switch. In the position shown in FIG. 7, the blades engage the contacts 167a, 167b and 167c, respectively. When in the position shown in FIG. 8, the blades engage the contacts 166a, 166b and 166c, respectively. The jumper or connection 161 connects the contacts 166a and 166b, the jumper 162 connects the bases 163a and 163b, and the jumper 161a connects the contacts 167a and 167b, as clearly shown in FIGS. 7 and 8.

The conductor wire 112 connects the battery 110 with the contact 167a, and the conductor 118 connects the power output post or connection 119 of the alternator 120 with the central base or post 163a of the switch, while the conductor 121 connects the fuse or circuit breaker 122 with the contact 166a of the switch. The other circuit conductors and circuit elements are identical with those of the form illustrated in FIGS. 5 and 6, the conductor 146 being connected to the central post or base 163c of the blade 164c of the switch and with the stator or field relay connection 147 of the voltage regulator. Similarly, the conductor 149 connects the contacts 167c with the stator connection 150 of the alternator in the same manner as those elements are connected in FIG. 5. The jumpers 161 and 161a connect the set of two contacts 166a and 166b, and the set of two contacts 167a and 167b, respectively, so that when the switch blades 164a and 164b are moved into engagement with either set of contacts at either throw position, the battery or normal throw position of FIG. 7, or the remote power unit throw position of FIG. 8.

The power outlet post 119 of the alternator 120 is connected, in FIG. 7, with the ordinary battery ignition, light and accessory circuit of the automobile in the usual manner. The two blades 164a and 164b swinging on the bases 163a and 163b engage the contacts 167a and 167b to provide an increased current capacity for flow of energy from the alternator through the switch to the battery and the vehicle ignition circuit connected therewith. This prevents damage to the switch by overloading in use of the vehicle electrical system. When the switch is moved to the remote power unit position shown in FIG. 8, the two swingable blades 164a and 164b engage the contacts 166a and 166b which are connected by the jumper or conductor 161 to provide a path of flow of energy from the alternator through the switch to the remote outlet receptacle 125. Should the current withdrawal through the receptacle outlet be excessive, the circuit breaker or fuse 122 will break the circuit and disconnect the alternator from the power outlet receptacle 125. When the three blades of the three pole double throw switch are in the position shown in FIG. 7, the blade 164 c connects the stator contact or connector 150 of the alternator 120 to the voltage regulator 138 by means of the conductor 149, the contact 167c, the blade 164c, the base or pole 163c and the conductor 146 to the stator connection 147 of the voltage regulator, and the circuit operates in the usual manner. The power to the field connection 139a of the alternator is supplied through the switch controlled ignition, light and accessory electrical circuit of the vehicle in the usual manner.

When the switch is moved to the remote power position shown in FIG. 8, the blades 164a and 164b connect the power outlet post 119 of the alternator through the conductor 118 and the base posts 163a and 163b with the contacts 166a and 166b which are joined by the jumper or connector strap 161, so that the power from the alternator passes through the switch, through both blades 164a and 164b to the conductor 121, the fuse 122, the conductor 124 and into the remote power unit outlet receptacle 125. The blade 164c connects the battery by means of the conductor 112, the conductor 141, the resistor 140 and the conductor 142 connected to the contact 166c through the blade 164c to the base or post 163c and thence through the conductor 146 to the stator or field relay connection 147 of the voltage regulator 138. The battery thus energizes the field relay circuit of the voltage regulator and the switch controlled ignition, light and accessory circuit of the vehicle electrical system controls the delivery of the power from the voltage regulator to the field connection 139a of the alternator in the usual manner.

From the foregoing, it will be seen that a vehicular remote electric power output accessory unit for power tools and the like has been provided which is attachable to the electric system of a motor vehicle to supply electrical power for the operation of hand tools or other electrical power requiring units. The alternator of the vehicle is utilized as a source of power, and switching means is provided for connecting the power output of the alternator selectively with either the usual battery and electrical system circuitry of the vehicle for normal operation, or for disconnecting the battery and normal electrical circuit of the vehicle from the alternator power output and connecting the remote power unit outlet with the alternator for supplying the electrical energy from the alternator to the remote power outlet receptacle for operation of hand tools such as drills, saws, sanders and other AC-DC motor driven tools, and for electrical welding, or quick charging of batteries, or the like.

The voltage output from the alternator is controlled by the speed of the engine of the vehicle driving the alternator and the indicator lamp may be used to indicate the fact that the circuit is operative and that a suitable power or energy quantity is being delivered to the outlet. If desired, a volt meter may be connected in the system parallel to the remote power outlet socket for indicating the voltage delivered across the socket or outlet receptacle.

It will also be noted that in the form of the invention shown in FIGS. 1 through 4, means has been provided for protecting the voltage regulator of the vehicle from the application of excessive energy thereto while the remote power unit is in operation, and at the same time supplying sufficient energy from the battery to the field coils of the alternator to produce the desired result. Also, the switching unit shown in FIGS. 3 and 4 provides a higher current capacity in the switch for power from the alternator through the battery to the battery and switch controlled ignition, light and accessory electrical circuit of the vehicle for normal use.

The devices of FIGS. 5 through 8 provide for a positive separation of the power output of the alternator from either the automobile battery circuit or the power unit circuit while the other is energized, so that there is no possibility of either circuit being operable while the other is in use. These circuits likewise provide means for protecting the voltage regulator against excessive potential across the stator windings or stator circuit of the regulator during use of the power unit circuit.

It is also readily apparent that all circuits illustrated provide means for protecting the voltage regulator during the use of the remote power unit and that the system is equally adaptable to most automotive vehicle power generating and ignition systems currently in operation.

It will particularly be noted that the provision of the battery potential applied through the resistor to the field relay coil circuit of the voltage regulator provides means for applying potential across the field windings of the alternator through the usual vehicle electrical circuits (not shown) during use of the remote power units. The several circuits are economical to construct and operate, and are substantially fool-proof to install.

The foregoing description of the invention is explanatory only, and changes in the details of the constructions illustrated may be made by those skilled in the art, within the scope of the appended claims, without departing from the spirit of the invention.

What is claimed and desired to be secured by letters patent is:

1. A remote power supply unit for vehicles for connection in the regular alternator electrical system of such vehicle to supply electrical power to a remote outlet for the operation of electric power tools, said unit being adapted for attachment to a vehicle having an electrical circuit including a battery, an alternator having an output terminal, and a voltage regulator with a switch controlled ignition, lights and accessory circuit connecting the voltage regulator, battery and the alternator in the usual manner, said remote power supply unit comprising: a remote outlet load connection; single double throw switch means comprising the sole electrical circuit switching means in said power supply unit and having a pair of movable switching blade means engageable with a first pair of contact means at a first throw position and movable simultaneously to be engageable with a second pair of contact means at its second throw position; one of said switching blade means when in a first throw position electrically connecting the output terminal of the alternator with the remote outlet load connection and with the battery; the other movable switching blade means when in said first throw position connecting the stator connection of the voltage regulator to the stator connection of the alternator; said one movable switching blade means when moved to said second throw position disconnecting the output terminal of the alternator from said battery; and leaving only said remote outlet load connection connected to the power output of the alternator; said remote outlet load connection being connected with said power output of said alternator at all times; said other movable switching blade means when moved simultaneously with said one switching blade means to said second throw position disconnecting the stator connection of the voltage regulator of the electrical circuit of the vehicle from the stator connection of the alternator and connecting said stator connection of said voltage regulator with the battery for operation of the electrical circuit of the vehicle for operation of the vehicle to supply power to the alternator for driving the same to supply electrical energy to the remote outlet receptacle.

2. A remote power supply unit of the character set forth in claim 1 including: means for controlling the potential supplied from the battery to the regulator and alternator when the power output of the alternator is connected directly to the remote power outlet connection, for protecting the voltage regulator and alternator during use of the remote power outlet connection.

3. A power unit of the character set forth in claim 1 wherein circuit breaker means is provided in the circuit between the switch means and the remote power outlet connection for preventing overloading the alternator by excessive withdrawal through the remote power outlet connection.

4. A circuit of the character set forth in claim 1 wherein an indicating light is connected in parallel with the power outlet connection for indicating that the outlet connection is under power and in operation.

5. A remote power supply unit of the character set forth in claim 1 wherein said switch means comprises: a three pole double throw switch having two swingable pole blades of the switch electrically connected together and having the two contacts on each throw of the switch with which the two electrically connected pole blades are engaged in each separate throw position also electrically connected together, whereby the two electrically connected swingable pole blades of the switch and the electrically connected contacts of each throw of the blades provide an increased current carrying capacity in the switch between the output terminal of the alternator and the battery.

6. A remote power supply unit for supplying electrical power to an electrical power requiring device, said unit being adapted for connection in a vehicle electrical circuit including a battery, a motor driven electricity generating alternator, a voltage regulator, and a switch controlled ignition, lights and accessory circuit, said power unit comprising: single double pole double throw switch means comprising the sole electric circuit switching control in said power unit; a fused output receptacle having contacts for receiving electrical connectors from DC power operated tools or the like connected between the ground and one first contact means of the double throw switch means; means electrically connecting the output terminal of said alternator to said first contact means of said switch means whereby said output receptacle is electrically connected to said output terminal of the alternator at all times; said double throw switch means having one swingable pole blade means connected as its base to the battery of the vehicle electrical system and swingable either to a first throw position wherein said one blade means engages said first contact means and connects the alternator output terminal electrically to the battery of the vehicle electrical system for normal vehicle operation or to a second throw position wherein said one blade means connects said battery with the field connection of the voltage regulator and disconnects the alternator output terminal electrically from the battery of the vehicle switch controlled electrical system and leaves only said fused output receptacle connected electrically to said alternator output terminal; and having the second swingable pole blade means connected at its base to the stator connection of said voltage regulator and swingable simultaneously with said first blade means to said first throw position in which said stator connection of said voltage regulator is connected to said alternator stator connection, and to a second throw position in which said stator connection of said voltage regulator is connected with said battery and said vehicle electrical system of the vehicle for operation thereof.

* * * * *